United States Patent Office 2,933,161
Patented Apr. 19, 1960

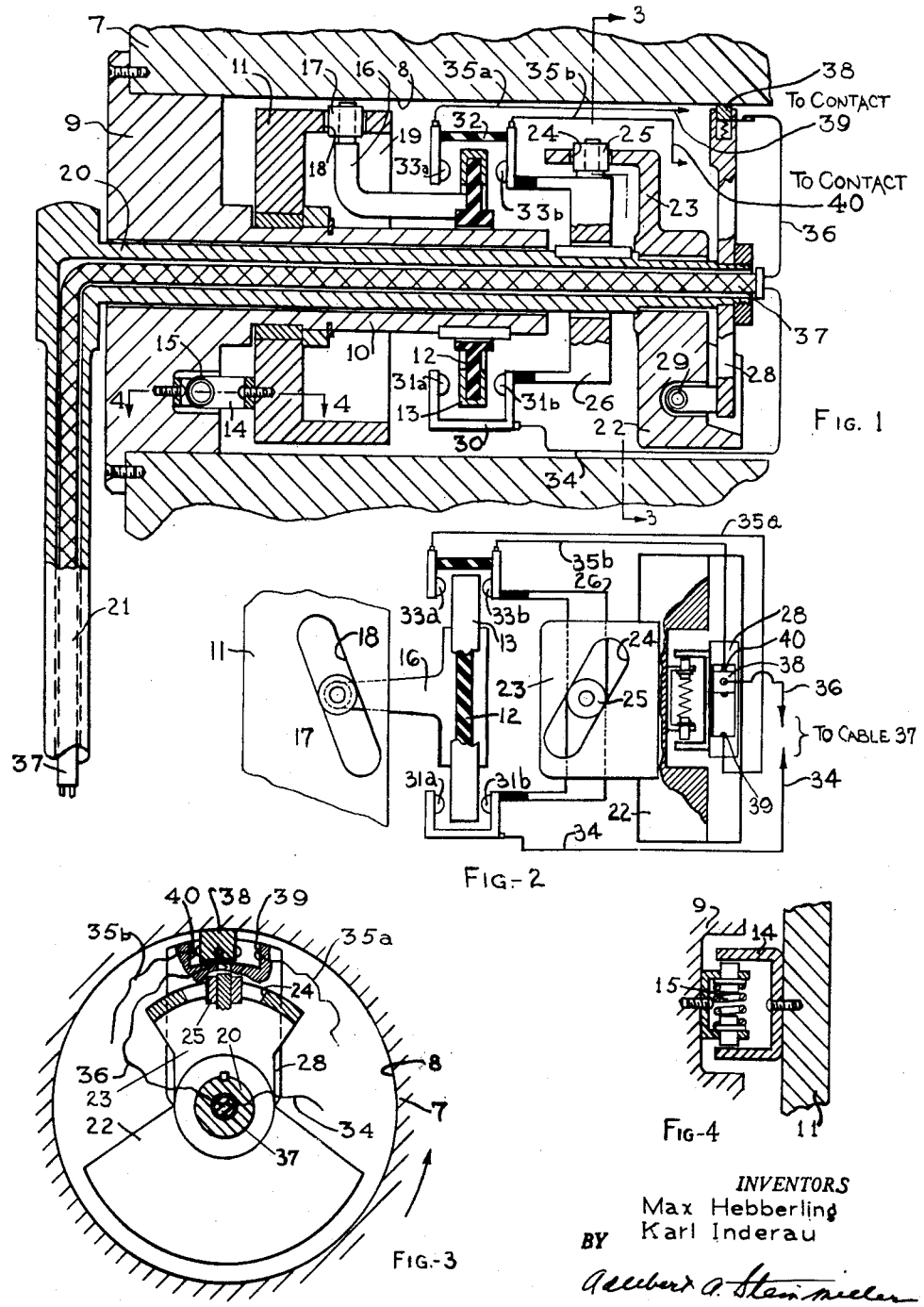
April 19, 1960  M. HEBBERLING ET AL  2,933,161
CONTROL APPARATUS FOR DETECTING VEHICLE WHEEL SLIP
BY RELATION OF ANGULAR DECELERATION OF
WHEEL TO ITS LINEAR RETARDATION
Filed June 9, 1955  2 Sheets-Sheet 1
INVENTORS
Max Hebberling
Karl Inderau
BY
ATTORNEY

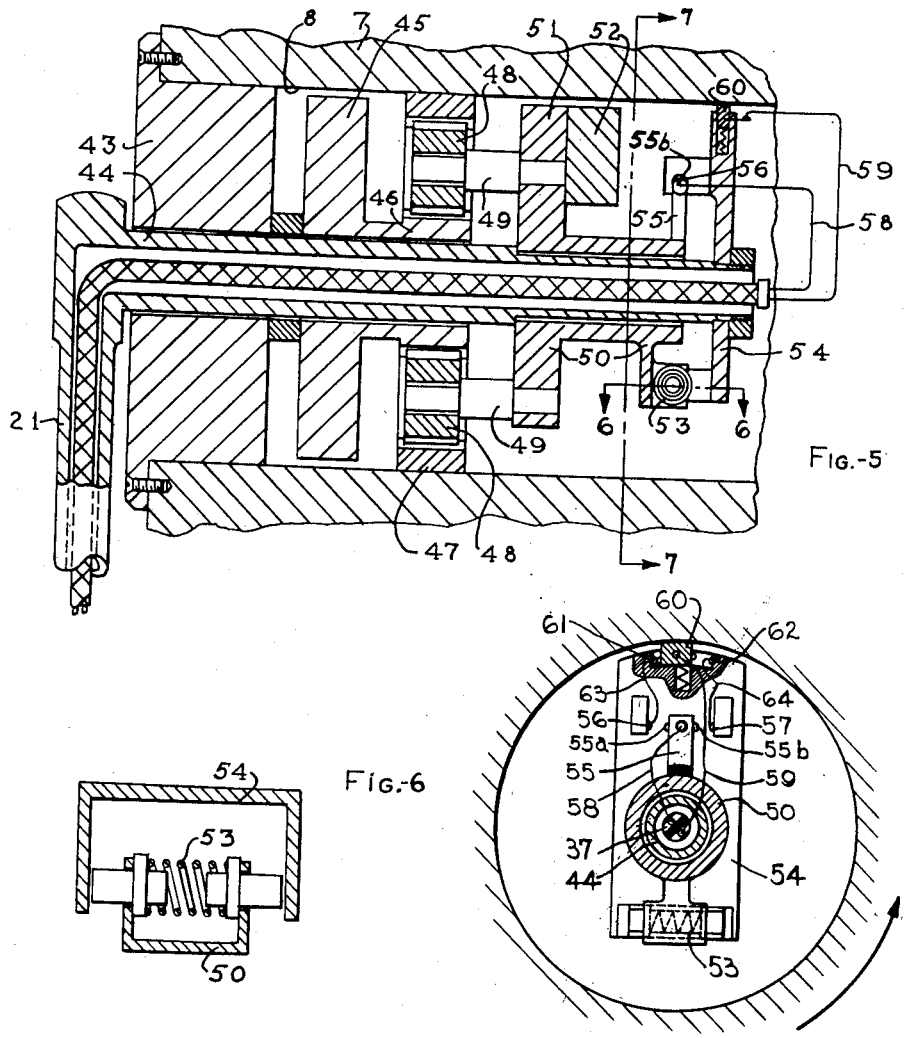

2,933,161

CONTROL APPARATUS FOR DETECTING VEHICLE WHEEL SLIP BY RELATION OF ANGULAR DECELERATION OF WHEEL TO ITS LINEAR RETARDATION

Max Hebberling, Berlin-Charlottenburg, and Karl Inderau, Hannover, Germany, assignors to Westinghouse-Bremsen-Gesellschaft m.b.H., Hannover, Germany Application June 9, 1955, Serial No. 514,208

Claims priority, application Germany June 21, 1954

14 Claims. (Cl. 188—181)

This invention relates to control apparatus for detecting vehicle wheel slip by relation of angular deceleration of the wheel to its linear retardation and, more particularly, to such control apparatus operable, upon detection of the wheel-slipping to prevent sliding of the vehicle wheel.

Each wheel of a vehicle, if at all possible, should continue a smooth rolling movement on its runway at all times and under all conditions. Any sliding between the wheel and its runway can bring about an abrupt reduction in the coefficient of friction between said wheel and said runway. This sliding is especially detrimental during the velocity changes as effected by brake operation. Deceleration of the vehicle itself corresponding to the braking force applied to the wheels can be obtained only if all the wheels continue their rolling movement, without slipping or sliding, throughout the braking operation. Excessive braking force, therefore, on a single wheel, which would tend to bring about locking and sliding of the wheel, must be quickly reversed.

Some of the presently known regulating arrangements effect a control impulse to the brake equipment, in the nature of a brake release, when the rolling velocity deceleration of the wheel reaches a previously established value. Thereby, the amount of negative acceleration which occurs at the wheel is utilized to influence braking procedure or control. These regulating procedures utilize, as control members, either an inertia wheel reacting to the negative acceleration of the vehicle wheel or they contain fly weights which work in conjunction with an auxiliary arrangement governed by a time factor. These well-known regulators do not satisfy the established purpose of such an arrangement inasmuch as their manner of operation is dependent upon a definitely established deceleration value of the rotating movement of the wheel and, therefore, there is no consideration given to the different degrees of effects which may be favorable or unfavorable with respect to sliding movement between wheel and runway.

The inefficiency of these well-known arrangements is evident if, for example, we consider a rail vehicle which is equipped with magnetic rail brakes, as well as the usual wheel brakes, and through which rail brakes we transmit an emergency application. A negative acceleration is effected on the wheels through the wheel brakes which, with this equipment, may possibly be considered as corresponding to the optimum obtainable braking force. But the wheels are additionally braked by the action of the magnetic brakes on the rails and further negative acceleration is thereby produced thereon. Since now the total deceleration of the rotating movement of the wheels definitely exceeds the lower limit of the basic value of the regulating valve adjustment, the regulating valve will effect a control impulse on the magnetic brake equipment similar in nature to the release of the wheel brakes. The result therefrom is a decrease of the braking force and a corresponding lengthening of the brake distance, even though sliding movement between the wheel and rails was prevented.

If, then, we select a rotative-deceleration determining or detecting valve for actuating the regulating arrangement, which valve, under the previously described driving conditions, is responsive to such a high rotative-deceleration that a self-started release of the wheel brakes is prevented, then occurrence of locking and sliding of the wheels under such driving conditions, where low frictional values prevail between wheel and rail, cannot be prevented by this mechanism. This is one disadvantage of the well-known wheel-slide protection arrangements.

The ratio of the rotational movement between a wheel and its runway are characterized by the rotation of the wheel around its axle and a progressive, or linear, movement of its axle, which can hereby be compared to the same value as the progressive, or linear, motion of a non-turning point of the vehicle as opposed to the runway of the wheel. The rolling motion of a wheel can transpose itself to a sliding movement. This condition can develop quickly whenever the wheel ceases to turn so that the locked wheel shortly is sliding. During simple rolling movement of the wheel the starting velocity, at the point of contact of the wheel with the ground, is the same as the traveling velocity of the wheel axle. Likewise then there is existing an angular acceleration of the wheel which has a definite established ratio to the travel velocity change which is dependent on the roll radius. Therefore, there are always two physical values to be considered in the determination of the movement conditions of a rolling wheel. This invention depends upon the utilization of these considerations to provide an arrangement which will prevent the occurrence of wheel-sliding.

According to this invention, a control impulse is effected on the brake equipment of the vehicle through the new regulating arrangement, which impulse is activated by the difference in the setting of two control members, whereby the setting of one control member is dependent upon the movement condition of the wheel, and the setting of the other control member is dependent upon the movement of a non-turning portion of the vehicle as opposed to the runway of the wheel.

For example, a control impulse in the nature of a brake release is automatically effected upon occurrence of sliding movement between the wheel and the runway, the regulating arrangement, according to the invention, being capable of effecting such an impulse under conditions covering all practical situations of velocities and decelerations encountered during braking operation, without being dependent upon a previously established deceleration value of the turning motion of the wheel.

The idea conveyed by the invention can be made operational by means of two velocity measurements.

The turning motion of a wheel, which is to be protected, will then be compared with the turning motion of a wheel on which either a braking force or a driving force is exerted from the vehicle. The difference between the peripheral velocities of these wheels is the measure for a proportional control impulse which is to be exerted on the brake equipment. Since, with the latest type vehicles, all wheels are braked, the realization of the invention ideas cannot be carried out practically by the means above described. Therefore, it is necessary to provide a special measuring wheel which turns along with the wheel adapted to be braked.

An alternative method, other than the two-velocity-measurement method described above, for realization of the invention idea provides, for example, on rail vehicles units with a larger number of wheels, that the nominal value for the peripheral velocities of all the existing wheels be used as the comparison value for the single wheels which are to be protected. This nominal value formation can be very simply proportioned by electrical means.

Considering now the method of comparing the values of two velocity measurements, the reaction of an inertia wheel which is coupled on the same axle as the wheel which is to be protected, may be used for measuring the angular acceleration acting on the turning wheel. The variation of the inertia wheel in comparison with the vehicle wheel is transmitted to a control member which effects a control impulse.

In addition, a pendulum which is suspended on the vehicle frame (it should be understood that, if necessary, an optional spring-mass-system may be used) also gives a measurement for velocity changes, because of its deflection from a normal perpendicular position corresponding to uniform movement. Deflection of the pendulum serves for adjusting a second control member which works in conjunction with the control member previously mentioned that is acted upon by the inertia wheel.

Both adjustments are proportional to the exerted acceleration (or deceleration).

Whenever the angular acceleration (or deceleration) and the vehicle acceleration (or deceleration) correspond to each other, the wheel will continue to follow its normal rolling movement. Both control members operate together in such manner that, during normal rolling movement, a control impulse is not released by their adjustment.

A difference between the two acceleration values and the adjustments effected thereby on the control members is a measurement of the slipping or sliding action of the wheel on its runway. Upon occurrence of such a difference, if the difference is greater than the sensitive response in the regulating arrangement, the control member will effect a control impulse on the brake equipment.

Another feature of the invention consists of an automatic reversing mechanism which is dependent upon the direction of rotation. Corresponding to the direction of rotation of the wheel, one of the two control members is connected in such a manner with the brake equipment that a control impulse can be released only during a brake sequence in which the negative deceleration of the wheel is greater than the linear deceleration of the vehicle, which in contrast does not instigate an undesired repeat interruption of the brake sequence during further deceleration. This disadvantage may be found in the well-known wheel-slide protection devices mentioned above. The reversing mechanism, which is dependent upon the direction of rotation of the wheel, also serves as a substantial improvement over these well-known devices.

By use of the reversing mechanism, above mentioned, there is an additional possibility of utilizing a regulating arrangement of this type for cutting in a wheel-slip prevention brake for rail motor-cars. In this situation it becomes necessary to permit the reversing mechanism to operate so that a control impulse is effected on the respective brake when the positive angular acceleration of the wheel is greater than that incurred by the vehicle velocity increase. In this case, the control impulse must therefore be in the nature of an application of the brakes on the slipping wheel. It is possible to provide a second reversing mechanism, operated by control members, to thereby establish the same regulating arrangement either for slide protection during braking or for wheel-slip protection during commencement of acceleration.

According to the invention, the adjustments originating from the revolving inertia wheel which is coupled to the wheel that is to be protected, by means of an anchored spring, and the adjustments originating from the mass forces of a pendulum hanging from the non-rotating portion of the vehicle, are transmitted to the control members which serve to release a control impulse on the brake equipment.

In a second embodiment of the invention, a planetary gear serves for the purpose of comparing with each other the mass amount of an inertia wheel and the mass moment of a pendulum. A difference in both moments instigates an adjustment of the control members against the moment of a spring force, which adjustment exerts a control impulse on the brake equipment.

Further features of the invention will be derived from the following more detailed description thereof. Two examples of regulating arrangements for rail vehicles embodying the invention are shown schematically in the accompanying drawings wherein; Fig. 1 is an elevational view, mainly in section, of a regulating arrangement embodying the invention; Fig. 2 is a partial top view of the control members according to Fig. 1, one of said control members being rotated 90° in the drawing for purposes of clarity; Fig. 3 is a sectional view taken along the line 3—3 of Fig. 1 in the direction of the arrows; Fig. 4 is a sectional view taken along line 4—4 of Fig. 1 in the direction of the arrows; Fig. 5 is an elevational view, mainly in section, of a second embodiment of the invention; Fig. 6 is a sectional view taken along line 6—6 of Fig. 5 in the direction of the arrows; Fig. 7 is a sectional view taken along the line 7—7 of Fig. 5 in the direction of the arrows; and Fig. 8 is an electrical control schematic for the embodiment shown in Fig. 5.

A regulator base 9 is inserted into a center bore 8 of a rotating axle or a wheel-body 7 and is securely fastened therein. An inertia wheel, or flywheel, 11 is mounted on a hollow shaft 10 so as to be rotatable thereon but fixed against axial movement, whereas a control disk 12 also mounted on said shaft is held against rotation relative thereto by a key and key-way arrangement but may move axially relative to the shaft. The inertia wheel 11 is elastically coupled, as shown in Fig. 4, by means of the yoke 14, the opposite arms of which engage buttons biased apart by a spring 15, the buttons being carried in holes of opposite arms of another yoke attached to the base 9. An arm 16, which is securely attached to the control disk 12, carries on its free end a roller 17 which is situated in a groove 18 that is provided in the inertia wheel 11 in a coaxially extending cylindrical portion 19. The function of the slot 18, through the roller 17, is to produce a corresponding axial movement of the disk 12 upon occurrence of a relative movement between said disk and the flywheel 11. A hollow non-rotating arbor 20, which is disposed coaxially within the hollow shaft 10 of the regulating base 9, projects from this assembly at both sides. The outer or left-hand end, as viewed in the drawing, of the hollow arbor 20 is connected with a lever 21 which is also hollow and which prevents the hollow arbor 20 from turning. To prevent this turning, the hollow lever 21 is connected with the vehicle frame or a truck in such a manner that even with spring deflection movement between the wheel set and the vehicle frame, the lever does not change its inclination with reference to the rails. In Figs. 1 and 5 of the drawing the hollow lever 21 is arbitrarily positioned in the plane of the drawing.

The hollow arbor 20 carries on its inner end, which projects from the hollow shaft 10, a pendulum 22 that is capable of swinging in a plane in the direction of travel, but is restrained, however, from moving axially relative to said hollow arbor. A lateral beam 28, which is secured to the inner end of the arbor 20, has a lower arm to which the pendulum 22 is elastically connected by means of a spring 29, in a manner similar to the connection at 14, 15. A fish-like plate 23 formed at the upper end of the pendulum 22 has formed therein a slot 24 which receives a guide roll 25 of a control member 26. The control member 26, which is carried by the arbor 20, is capable of axial movement relative thereto but not angular movement.

The control member 26 mounts two contact-carrying levers 30 and 32 which straddle the control disk 12 in such a manner that by axial movement of both control members 12 and 26 relative to each other, either in a left-hand or right-hand direction, as viewed in Figs. 1 and 2 of the drawing, either of a set of contacts 31a and 33a or a set of contacts 31b and 33b respectively can be connected by contacting a ring-shaped contact metal ring 13 arranged on the control disk 12 which is of insulating material. This arrangement provides, in effect, electrical switch means. The contacts 31a and 31b which are themselves connected electrically to each other through the arm 30, are connected by means of a wire 34 to one wire of a cable 37 which leads to the exterior through the hollow arbor 20 and hollow lever 21. Contacts 33a and 33b, which are insulated from each other by the arm 32, have wires 35a and 35b respectively leading therefrom to two oppositely arranged contacts 39 and 40 respectively of a control switch device which is carried by the upper arm of the lateral beam 28. A sliding piece 38, slidably movable between the two contacts 39 and 40, is permanently connected by an electrical wire 36 to a second wire of the cable 37.

The flywheel 11, the pendulum 22 and the control members 12 and 26 are shown in the drawing in a normal position which they assume when the vehicle is stopped or when the vehicle is moving and the wheels are rolling free of slipping or sliding. The base 9, the flywheel 11 and the control disk 12, which revolve around the wheel body, are shown in the drawing and arranged relative to each other in such a manner that the arm 16 which joins the control disk 12 to the inertia wheel 11 and the yoke 14 connecting said inertia wheel to said base, lie in the plane of the drawing.

The inertia wheel 11 is positioned, relative to the regulator base 9, in its normal position. Therefore, the guide roller 17 is also in the middle of the length of the slot 18 so that the control disk 12 is correspondingly held in its middle position axially relative to the arbor 20. The pendulum 22 is also in its normal position, so that the control member 26, movement of which is dependent upon the slot 24 and the guide roller 25, assumes its middle position. The contacts of the levers 30 and 32 therefore do not engage the contact 13 of the control disk 12.

If rolling movement of the wheel is accelerated or decelerated, mass forces exerted on the inertia wheel 11 and the pendulum 22 are established in a definite proportion to each other, which proportion is dependent upon the roll radius of the wheel. By a predetermined quantity of the masses of 11 and 22, the return force of the springs 15 and 29, the slope and length of the slots 18 and 24, as well as the operating radius through which the guide rollers 17 and 25 effect movement of said control members, the axial movements of said control members relative to each other and the axial distance which they may move, is definitely established, and in this case, are both of the same amount during normal rolling movement of the wheel 7.

The control disk 12, then, remains in its middle position between the levers 30 and 32, so that no contact is made by the contact ring 13 with either set of contacts on the arms 30 and 32.

By making an appropriate adjustment of the masses 11 and 22, or of the forces of the springs 15 and 29, or of the slope and length of the slots 18 and 24, it is possible to adjust the regulating arrangement for a wheel of a different roll radius.

When the rolling motion of the wheel 7 is disturbed because of slipping between the wheel and the rail, then the mass forces acting on the inertia wheel 11 and the pendulum 22 no longer correspond with each other.

This difference in mass forces serves to effect engagement of the contacts 31a, 33a or the contacts 31b and 33b by the contact ring 13. An electrical current circuit is thereby closed through the cable 37 which may be connected to an electric magnet valve (not shown), for example, which is energized to effect release of fluid pressure from a brake cylinder which exerts braking force on the wheel and thereby release the brakes to restore the wheel to normal turning motion.

Let it be assumed that the wheel 7 is turning in the direction indicated by the arrow in Fig. 3. The sliding member 38 of the reversing mechanism, through frictional engagement with the bore 8, is carried to the position shown in Figs. 2 and 3 in the drawing, that is, into engagement with the contact 40. Should the rotation of the wheel 7 be reversed, the switch 38 would be moved into engagement with the contact 39. Through the sliding member 38 and the contact 40, the wire 35b is connected with wire 36. This is shown schematically in Fig. 2. During deceleration of the wheel 7, in the absence of wheel-slip, the control members 12 and 26, and consequently the contact ring 13 and the levers 30 and 32 with the contacts 31a, 31b, 33a and 33b, move to the right simultaneously. If, however, during a braking sequence, the angular deceleration of the wheel 7, because of slipping, is greater than linear deceleration of the vehicle, the contact ring 13, through the disproportionate adjustments between the inertia wheel 11 and the pendulum 22, moves against the contacts 31b and 33b and the current circuit is thereby closed. The magnet valve circuit is thereby energized to effect release of the brakes and thereby restore normal angular velocity to the wheel 7. Acceleration of the wheel 7 back to normal velocity effects movement of the contact ring 13 to the left, which interrupts the current circuit and effects re-application of the brakes. It is immaterial that the acceleration of the wheel 7 is so energetic as to effect bouncing movement of the contact ring 13 back against the contacts 31a and 33a. Such engagement of the contact ring 13 with the contacts 31a and 33a does not effect closing of any circuit as will be seen in Fig. 2, because of the present position of the sliding member 38.

Should the wheel 7 be turning in the opposite direction, however, the sliding member 38 would be in engagement with the contact 39 and thereby connect wire 35a with wire 36. The regulating arrangement then would operate according to a reversal of the action of the forces and the movements on the individual members in a manner similar to that previously described.

If the arrangement is to be utilized for controlling wheel-slip during acceleration of the wheel, it is merely necessary to cross over the wires 35a and 35b and connect them to contacts 33b and 33a, respectively. Naturally, for this purpose, the magnet valve (not shown) which is controlled by means of the cable 37, must effect charging of the brake cylinder to apply the brakes.

According to a second embodiment of the invention as shown in Fig. 5, a regulator base 43 is firmly secured in the center bore 8 of the wheel body 7. A hollow, non-rotative arbor 44, which supports all the remaining parts of the regulating device, extends coaxially through the base 43 into the bore 8 of the wheel body 7. The lever 21, as in the first mentioned embodiment of the invention, connects the arbor 44 to the vehicle frame to prevent rotation of said arbor. An inertia or flywheel 45 and a planetary gear 46 connected therewith in coaxial relation, are rotatably carried by the arbor 44. The planetary gear 46, and therefore the inertia wheel 45, is driven through idler gears 48 by an orbit gear 47 firmly secured in the bore 8 for rotation with the wheel 7. The idler gears 48 are rotatively supported on studs 49 extending from a cross member 50 carried by the arbor 44, which cross member is capable of angular displacement relative to said arbor but not axial movement relative thereto. Angular displacement of the cross member 50 is limited by an elastic coupling comprising a tension spring 53 which is arranged between said cross member and a lateral beam 54 that is non-rotatively mounted at the inner end of the arbor 44, as shown in Fig. 6. A pendulum mass 52 is associated with an upper leg 51 of the cross member 50.

In deviating from the construction just described, it is possible to employ a one-armed cross member 50 supporting only one idler gear 48. The mass of the idler gear 48 and the arm, taken together, may serve as the pendulum mass.

In a normal position of the cross member 50, which position is assumed when the vehicle is stopped or when the wheel 7 is rotating without slip, an elastic switch member 55 carried by the cross member 50 is situated, without engagement, between two contacts 56 and 57 which are mounted on the lateral beam 54, said switch member being capable of movement between the contacts 56 and 57 for engaging one or the other, as may be seen in Fig. 8. A set of contacts 55a and 55b carried by the switch member 55 is constantly connected by means of a wire 58 to one wire of the cable 37, which leads to the exterior through the hollow arbor 44 and the lever 21. A second wire 59 connects the second wire of the cable 37 with a sliding member 60 of a reversing switch arrangement, said sliding member being carried by the lateral beam 54 in a fashion similar to the sliding piece 38 as above described in connection with Fig. 1.

According to the arrangement of the gears 46, 47 and 48, that is, with the idler gears 48 intervening between the orbit gear 47 and the planetary gear 46, the inertia wheel 45 rotates in a direction opposite to the direction of rotation of the wheel 7 and with a greater number of revolutions per given time interval.

During uniform rolling motion, the wheel 7, which is protected by the regulating arrangement, exerts only a small moment on the cross member 50—which carries the intermediate or idler gears 48—because of the small amount of friction between the gear teeth which friction is dissipated through the spring 53 on the lateral beam 54. The moment on the cross member 50, therefore, during normal rotation of the wheel 7 is insufficient to deflect said cross member from its center or vertical position because of the spring 53 which is under compression. During such time that the vehicle may be stopped or during the time that the wheel 7 is rolling without slip so that the linear motion of the vehicle is synchronous with the rolling motion of the wheel 7, the pendulum 52 does not effect any displacement of the cross member 50 and the switch member 55 is therefore positioned in its center location between the contacts 56 and 57.

When the rolling motion of the wheel 7 is accelerated or decelerated, a moment that is brought about by the change in the angular veloctiy of the inertia wheel 45, is exerted on the cross member 50. The corresponding change in linear velocity creates a mass force which likewise exerts a moment on the arbor 44 according to the mass 52. The direction of rotation of both of these moments are opposed to each other corresponding to the arrangement of the pendulum 52 on the upper portion 51 of the cross member 50. The value of the reaction force originating from the planetary gear 46 with the inertia wheel 45 and exerted on the cross member 50 is established at a definite proportion (dependent only upon the roll radius of the wheel 7) to the value of the mass forces operating on the pendulum mass 52. The value and arrangement of the masses 45 and 52 (and, of course, including the mass of the planetary gear 46 and the upper arm 51, respectively) as well as the reversing proportion of the planetary gear 46, are selected so that, with each rolling movement of the wheel, moments in equilibrium are exerted on the cross member 50. The switch member 55 therefore always remains in its normal or vertical position between the contacts 56 and 57 during normal rolling motion of the wheel 7, so that the current circuit cannot be closed by said contacts.

The moments of equilibrium on the cross member 50 are, however, disturbed when the rolling motion of the wheel 7 is interrupted by slipping between said wheel and the rail. A difference of moment is created so that the cross member 50 will be moved or displaced angularly relative to the arbor 44 against compression of spring 53. Depending upon the direction of this angular displacement, the switch member 55 will contact one or the other of the contacts 56, 57 so that the corresponding electrical circuit is closed.

Assuming that wheel 7 is rotating in the direction indicated by the arrow shown in Fig. 7, the sliding member 60 of the reversing switch arrangement will be in engagement with a contact 61 arranged oppositely to another contact 62 on the lateral beam 54. Contact 61 is constantly connected to the contact 56 by means of a wire 63. If, during braking operation, a wheel-slip should occur, so that a difference of moment is effected between the inertia wheel 45 and the pendulum 52, the switch member 55 will be moved out of its normal position or central position to effect engagement of the contact 55a with the contact 56. The current circuit between the wires 58 and 59 is then closed, as shown schematically in Fig. 7, whereby a release impulse can then be exerted on the brake arrangement through the cable 37.

After the brake has thus been released, the wheel 7 once again accelerates up to normal rotation, and the connection between the contacts 55a and 56 is interrupted by return of the switch member 55 to its central position thereby effecting a brake reapplication. If, however, the angular acceleration of the wheel 7 is such that the switch member 55 moves beyond its central position and engages the contact 57, a new control impulse is not exerted on the brake equipment, since the contact 57 has no connection with the wire 59 because of the position of the sliding member 60 of the reversing switch arrangement.

This arrangement offers the same utilization possibilities for controlling wheel-slip during acceleration of the wheel 7, as was mentioned in connection with the embodiment of the invention shown in Fig. 1.

The control impulse which is released by the control members, as above described, may be transmitted by means other than the electrical means described as, for example, by pneumatic means. In similar manner, the effect of the switch members can, by means of the control members, be exerted by electrical or pneumatical means in addition to the mechanical means. A complete separation of the members for the control of wheel rotation and the members for control of linear velocity of the vehicle, which, for example, can be accomplished by utilization of an electrical bridge connection between both parts of the regulating arrangement provides a possibility of using only one control organ on each vehicle or on each vehicle unit for the linear movement thereof. This can provide the comparison value for all control organs for the rotation of direction of the individual wheels or the wheel set. It can be mounted in any appropriate place on the vehicle.

The rotating inertia wheel 45 with the same switch organs which are dependent upon it can be mounted in an elastic manner so that these parts themselves form a spring-mass system corresponding to the condition of the progressive movement.

Having now described the invention, what we claim as new and desire to secure by Letters Patent is:

1. A control apparatus comprising, in combination, a vehicle wheel, a hollow shaft carried coaxially within the hub of said wheel for rotation therewith, a flywheel normally rotatable on said shaft in correspondence with the rotation of said wheel but capable of overrunning or lagging said wheel upon excessive angular deceleration or acceleration thereof, respectively, a first control member coaxially rotatable with said shaft but movable axially relative thereto, means interengaged between said flywheel and said first control member and operable responsively to said overrunning or lagging of said flywheel for causing axial movement of said first control member in one direction or in a direction opposite to said one direction, of an amount determined by the degree of said angular deceleration or acceleration, respectively, a hollow, non-rotative arbor extending through and projecting from both ends of said shaft, a pendulum pivotable on said arbor in either a forward or reverse direction relative to the direction of travel of the vehicle in response to excessive linear deceleration or acceleration, respectively, of the vehicle, a second control member coaxially supported on and axially movable relative to said arbor, means interengaged between said pendulum and said second control member and operable responsively to pivoting of said pendulum in either its forward or reverse directions to cause axial movement of said second control member in a direction and of an amount corresponding to the axial movement of said first control member when said angular deceleration or acceleration corresponds to said linear deceleration or acceleration, respectively, but of a different amount when said angular deceleration or acceleration differs from said linear deceleration or acceleration, respectively, and means actuated by said first and said second control members upon occurrence of said unequal axial movements of said control members.

2. The combination as defined in claim 1 wherein: the flywheel further comprises a coaxially-extending cylindrical portion having a slot therein formed diagonally to the circumference or at an angle to the axis of said portion, the first said means comprising a dog having one end attached to the first control member and having at the other end a roller which normally engages a central position in said slot but may move toward one end or the other of said slot upon overrunning or lagging of the flywheel for thereby causing the axial movement of said first control member, the pendulum further comprises an axially extending portion also having formed therein a slot at an angle to the axis of said pendulum, and the second-mentioned means interengaged between said pendulum and the second control member comprises a roller carried by said second control member and normally engaging a central position in said last-mentioned slot but adapted to move toward one end or the other of the last-mentioned slot for effecting axial movement of said second control member upon pivoting of said pendulum in either a forward or reverse direction.

3. The combination defined in claim 1 wherein the last-mentioned means comprises an electrical circuit adapted, when closed, for effecting a desired control impulse, and when open, for effecting cessation of said control impulse, said last-mentioned means further comprising electrical contact members carried by the first control member and the second control member and adapted to close said circuit upon occurrence of a difference of axial movement of the first control member and of the second control member and to open said circuit upon restoration of corresponding axial movement between said first control member and said second control member.

4. A control apparatus comprising, in combination, a vehicle wheel, a non-rotative arbor carried coaxially within the hub of said wheel, a first inertia mass normally rotatable on said arbor in accordance with the rotation of said wheel but capable of overrunning or lagging said wheel upon occurrence of excessive angular deceleration or acceleration, respectively, of the wheel, driving means interengaged between said wheel and said inertia mass for transmitting driving torque from the former to the latter, a cross-member carrying electrical contacts, said cross-member being pivotally supported on said arbor and connected to said first inertia mass in such a manner as to tend to be pivoted thereby in one direction or in the other direction upon occurrence of overrunning or lagging, respectively, of the first inertia mass, a switch device having electrical contacts adapted for opening or closing electrical circuits, and a second inertia mass carried by said cross-member and effective, upon occurrence of linear deceleration or acceleration corresponding to angular deceleration or acceleration of the wheel, for maintaining said cross-member in a normal position in which said cross-member contacts are disengaged from said switch contacts to open the circuit, and effective, upon occurrence of linear deceleration or acceleration of the vehicle in variance with angular deceleration or acceleration of the wheel, for displacing said cross-member to another position in which said cross-member contacts are engaged with said switch contacts to close the circuit.

5. The combination as defined in claim 4 wherein the first inertia mass comprises a flywheel, the driving means comprises an internal orbit gear coaxially secured in a bore in the hub of the wheel for rotation therewith, a planetary gear coaxially rotating with said flywheel, and idler gears meshed between said orbit gear and planetary gear, said idler gears being mounted on the cross-member to form the connection between the first inertia mass and said cross-member.

6. A control device for sensing the slipping condition of a vehicle wheel to one end of an axle having formed at said end an axial bore or recess, said device comprising said vehicle wheel, a support member removably and rigidly securable to the axle within said bore at the outboard end thereof and rotatable therewith, a non-rotative arbor extending through said support member from the outboard side thereof and supported thereby coaxially within the bore, a flywheel rotatively journaled on said support member within the bore, flexible coupling means between said support member and said flywheel through which said flywheel is rotatively driven and permitting limited angular movement of the flywheel relative to the wheel in accordance with the rate of change of angular velocity of the wheel, a pendulum element hingedly supported on said arbor within the bore, biasing means associated with said pendulum and said arbor so as to permit shifting of said pendulum out of a normal position correspondingly to the rate of linear retardation of the wheel and control means so arranged within the bore with said flywheel and said pendulum element as to be held inoperative thereby when the amount of said angular movement of said flywheel corresponds to the amount of said shifting of said pendulum due to corresponding rates of change of said angular velocity and said linear velocity but being operatively responsive to disparity in the amount of movement of said flywheel out of its normal rotative position relative to the wheel and the amount of movement of said pendulum out of its normal position due to a disparity in the rates of change of said angular velocity and said linear velocity.

7. A control device for sensing the slipping condition of a vehicle wheel, said device comprising a flywheel, gear means through which said flywheel is driven from the vehicle wheel reversely relative thereto and normally at a synchronous rate of rotation but capable of effecting relative rotative movement between said flywheel and said vehicle wheel in accordance with the rate of change of angular velocity of the vehicle wheel, an inertia element associated with said gear means and adapted, in response to rate of change of linear velocity of the vehicle wheel, for exerting a moment opposing the moment of the flywheel, the masses of said flywheel and said inertia element being of such magnitude as to exert equal opposing moments so long as said rate of change of angular velocity corresponds to said rate of change of linear velocity, said inertia element being shiftable out of a normal position to a different position by said movement of said flywheel relative to said vehicle wheel occasioned by a variance between said rate of change of angular velocity and said rate of change of linear velocity, biasing means for normally maintaining said inertia element in its said normal position but yieldable upon occurrence of said variance to effect shifting of said inertia element to its said different position, and control means actuated by such shifting of said inertia element.

8. A control device for sensing the slipping condition of a vehicle wheel, said device being adapted to be contained within an axial bore in the wheel or axle to which the wheel is non-rotatively fixed and opening to the outboard side of the wheel or axle, said device comprising a support member removably securable to the wheel or axle within said bore at the outboard end thereof, a non-rotative arbor extending through said support member from the outboard side thereof and supported thereby co-axially within the bore, a flywheel rotatively journaled on said arbor within the bore, gear means through which said flywheel is driven from the vehicle wheel and normally at a synchronous rate of rotation but capable of effecting relative rotative movement between said flywheel and said vehicle wheel in accordance with the rate of change of angular velocity of the vehicle wheel, an inertia element associated with said gear means and adapted, in response to rate of change of linear velocity of the vehicle wheel, for exerting a moment opposing the moment of the flywheel, the masses of said flywheel and said inertia element being of such magnitude as to exert equal opposing moments so long as said rate of change of angular velocity corresponds to said rate of change of linear velocity, said inertia element being pivotally shiftable about said arbor out of a normal position to a different position by said movement of said flywheel relative to said vehicle wheel occasioned by a variance between said rate of change of angular velocity and said rate of change of linear velocity, biasing means for normally maintaining said inertia element in its normal position but yieldable upon occurrence of said variance to effect shifting of said inertia element to its said different position, and control means carried on said arbor and actuated by said inertia element in its said different position.

9. For use in connection with a vehicle of the type having at least one pair of wheels secured to opposite ends of an axle which rotates with the wheels, an electrical control circuit including switch means effective, when closed, for initiating a control impulse for a device or devices remote from and controlled by said apparatus, a control member normally occupying a neutral position in which said switch means is open and being operable to a different position for closing said switch means, a first member normally rotatable in correspondence with the rotation of said wheels and being responsive respectively to either angular acceleration or deceleration thereof for either lagging or overrunning the wheels, a second member rotatable in coaxial relationship to said first member and normally occupying a stationary position relative to the vehicle and being responsive, respectively, to either linear acceleration or deceleration thereof for either lagging or overrunning the vehicle, said first and second members being so arranged as to maintain said control member in its neutral position at all times except upon occurrence of a difference in rate between said angular acceleration or deceleration and said linear acceleration or deceleration, respectively, and for operating said control member to its different position upon occurrence of more than a certain amount of such difference in rate, and base means secured in coaxial relation to said axle and within a recess formed in said axle for carrying said control member, said first member and said second member within said recess.

10. In combination, a vehicle axle having a pair of wheels secured at opposite ends thereof for rotation therewith and having a coaxially formed recess at one end, a first inertia member rotatively driven by said wheels in a normal rotative position relative to the wheels and having a force exerted thereon tending to move it out of said normal position according to the rate of change of angular velocity of the wheels, a second inertia member mounted for coaxial rotation relative to said first inertia member and having a normal rotative position relative thereto, said second inertia member being movable out of said normal rotative position responsively to a force exerted thereon according to the rate of change of linear velocity of the vehicle, control means operable by said first and second inertia members, upon rotative movement of one of the inertia members out of its respective normal position relative to the other resulting from a variance between the respective rates of change of said angular velocity and said linear velocity, for effecting imposition of a control impulse on any device desired to be controlled, and base means secured coaxially in said recess for carrying said inertia members and said control means within the recess.

11. For use in connection with a vehicle of the type having at least one pair of wheels secured to opposite ends of an axle which rotates with the wheels, apparatus comprising, in combination, two control members carried in coaxial rotatable relationship to each other, each having a normal position relative to each other and each being separately and rotatably adjustable out of a respective normal position, the adjustment of one member being dependent upon the rate of change of angular velocity of the vehicle wheels, while the adjustment of the other member is dependent upon linear retardation of the vehicle, said two control members being movable as a unit when adjusted out of their respective normal positions when the rate of change of angular velocity of the vehicle wheels coincides with the rate of change of linear velocity of the vehicle, control means operable responsively to a difference of adjustment between said control members, when said rates of change of velocities vary, for initiating a control impulse for effecting a desired control operation, and base means secured in coaxial relation to the axle and carrying said two control members and said control means within a recess formed in the axle.

12. For use in connection with a vehicle of the type having at least one pair of wheels secured to opposite ends of an axle which rotates with the wheels, apparatus comprising, in combination, first control means separately and rotatably adjustable out of a normal position responsively and proportionately to rate of change of rotative velocity of the vehicle wheels, second control means carried in coaxial rotatable relationship to said first control means and being separately and rotatably adjustable out of a normal position responsively and proportionately to linear retardation of the vehicle, said first control means and said second control means being adjustable out of their respective normal positions as a unit when said rate of change of rotative velocity of the wheels coincides with the linear retardation of the vehicle, electrical circuits through which a control impulse may be initiated for a device desired to be controlled, electrical switch means for closing or opening said circuits, said switch means being operable by said first and second control means acting jointly upon occurrence of a difference of respective adjustments thereof as effected by a variance between said rate of change of rotative velocity and said linear retardation, and base means secured in coaxial relation to the axle and carrying said first control means, said second control means and said switch means within a recess formed in the axle.

13. For use in connection with a vehicle of the type having at least one pair of wheels secured to opposite ends of an axle which rotates with the wheels, apparatus comprising, in combination, a control element effective upon predetermined movement out of a normal position to effect release of the brakes applied to the vehicle wheels and upon restoration to its normal position to effect reapplication of the brakes, a first angularly displaceable means effective to exert a displacing force on said element in one direction, upon angular displacement of said first angularly displaceable means, proportionately to the rate of change of angular velocity of the braked wheels of the vehicle, a second angularly displaceable means carried in coaxial rotatable relation to said first angularly displaceable means and effective to exert a displacing force on said element in a direction opposite to said one direction, upon angular displacement of said second angularly displaceable means, proportionately to the rate of retardation of the vehicle, said element being displaced out of its normal position responsively to the occurrence of a predetermined difference in the opposing forces exerted by said first and said second means, and base means secured in coaxial relation to the axle and carrying said control element, said first means and said second means within a recess formed in the axle.

14. A control device for sensing the slipping condition of a vehicle wheel, said device comprising a flywheel, flexible coupling means through which said flywheel is driven from the vehicle wheel so as to cause rotative movement of the flywheel relative to the wheel corresponding to the rate of change of angular velocity of the wheel, an inertia element carried in coaxial rotatable relationship to said flywheel, biasing means yieldingly resisting movement of said inertia element out of a normal position so as to cause rotative movement of said inertia element out of its normal position an amount corresponding to the linear retardation of the wheel, and control means having two cooperating, relatively movable elements, said elements having respective normal positions in which the elements occupy a spaced relation to each other, one of said elements being moved out of its normal position an amount corresponding to the degree of rotative movement of the flywheel relative to the wheel, and the other of said elements being moved out of its normal position an amount corresponding to the amount of rotative movement of said inertia element out of its normal position, relative movement of said elements exceeding a certain amount effecting cooperative contact thereof to indicate the slipping condition of the vehicle wheel.

References Cited in the file of this patent

UNITED STATES PATENTS

| | | |
|---|---|---|
| 2,012,366 | Wevers | Aug. 27, 1935 |
| 2,052,205 | Baughman | Aug. 25, 1936 |
| 2,317,133 | Hines et al. | Apr. 20, 1943 |
| 2,415,344 | Eksergian | Feb. 4, 1947 |
| 2,529,985 | Williams | Nov. 14, 1950 |
| 2,573,387 | Bush | Oct. 30, 1951 |
| 2,796,482 | Inderau | June 18, 1957 |